United States Patent
Li et al.

(10) Patent No.: US 10,904,536 B2
(45) Date of Patent: Jan. 26, 2021

(54) FRAME PROCESSING METHOD AND DEVICE

(71) Applicant: ArcSoft Corporation Limited, Hangzhou (CN)

(72) Inventors: Muhuo Li, Hangzhou (CN); Jin Wang, Hangzhou (CN)

(73) Assignee: ArcSoft Corporation Limited, Hangzhou (CN)

( * ) Notice: Subject to any disclaimer, the term of this patent is extended or adjusted under 35 U.S.C. 154(b) by 0 days.

(21) Appl. No.: 16/196,708

(22) Filed: Nov. 20, 2018

(65) Prior Publication Data
US 2019/0158853 A1    May 23, 2019

(30) Foreign Application Priority Data
Nov. 21, 2017  (CN) .......................... 2017 1 1166344

(51) Int. Cl.
| H04N 19/172 | (2014.01) |
| G06T 7/11 | (2017.01) |
| H04N 5/232 | (2006.01) |
| G06T 1/20 | (2006.01) |

(52) U.S. Cl.
CPC ............. *H04N 19/172* (2014.11); *G06T 1/20* (2013.01); *G06T 7/11* (2017.01); *H04N 5/23232* (2013.01)

(58) Field of Classification Search
None
See application file for complete search history.

(56) References Cited

U.S. PATENT DOCUMENTS

| 5,481,727 A  * | 1/1996 | Asano ................... H04N 19/98 711/150 |
| 6,870,883 B2 * | 3/2005 | Iwata ..................... H04N 19/61 375/240.01 |
| 7,123,769 B2 * | 10/2006 | Xiong ................... G06F 16/785 382/199 |
| 7,456,833 B1 * | 11/2008 | Diard .................... G06T 11/206 345/440 |
| 7,675,550 B1 * | 3/2010 | Linzer ................... H04N 1/212 348/220.1 |
| 9,172,923 B1 * | 10/2015 | Prins ........................ H04N 7/12 |
| 9,674,089 B2 * | 6/2017 | Jamond .................. H04L 69/04 |

(Continued)

OTHER PUBLICATIONS

IP.Com Search Report.*

*Primary Examiner* — Mohammad J Rahman
(74) *Attorney, Agent, or Firm* — Osha Bergman Watanabe & Burton LLP

(57) ABSTRACT

Provided are a frame processing method and device for use in image processing. The method includes: receiving a first frame by a first processing unit; sending, by the first processing unit and before receiving a second frame processed with a third processing unit, the first frame to a second processing unit, followed by processing the first frame with the second processing unit or processing the first frame with the second processing unit and another processing unit; and receiving a third frame by the first processing unit before the first processing unit receives the first frame processed with the second processing unit or the first frame processed with the second processing unit and the other processing unit. The method precludes frame hysteresis, at a fixed frame rate and with invariable frame processability of each frame.

20 Claims, 7 Drawing Sheets

(56) References Cited

U.S. PATENT DOCUMENTS

| | | | |
|---|---|---|---|
| 10,297,053 B1* | 5/2019 | Zitzelsberger | H04N 19/90 |
| 10,348,969 B2* | 7/2019 | Murakami | H04N 5/23287 |
| 10,417,771 B2* | 9/2019 | Somanath | G06T 7/136 |
| 2003/0169278 A1* | 9/2003 | Obrador | G06T 3/4015 |
| | | | 345/629 |
| 2008/0152014 A1* | 6/2008 | Schreier | H04N 19/172 |
| | | | 375/240.21 |
| 2009/0110310 A1* | 4/2009 | Kodama | H04N 19/647 |
| | | | 382/233 |
| 2010/0128927 A1* | 5/2010 | Ikenoue | G06K 9/00261 |
| | | | 382/103 |
| 2010/0296575 A1* | 11/2010 | Lee | H04N 19/119 |
| | | | 375/240.02 |
| 2011/0058708 A1* | 3/2011 | Ikenoue | G06T 7/277 |
| | | | 382/103 |
| 2011/0085601 A1* | 4/2011 | Lee | H04N 19/436 |
| | | | 375/240.25 |
| 2012/0050259 A1* | 3/2012 | Solomonov | G06T 15/005 |
| | | | 345/419 |
| 2012/0207383 A1* | 8/2012 | El Dokor | G06T 7/187 |
| | | | 382/154 |
| 2012/0230391 A1* | 9/2012 | Huang | H04N 19/436 |
| | | | 375/240.02 |
| 2013/0077690 A1* | 3/2013 | Wei | H04N 19/176 |
| | | | 375/240.16 |
| 2013/0113996 A1* | 5/2013 | Zhu | H04N 5/45 |
| | | | 348/565 |
| 2014/0002617 A1* | 1/2014 | Zhang | G01N 15/1463 |
| | | | 348/48 |
| 2014/0078258 A1* | 3/2014 | Chandraker | H04N 13/204 |
| | | | 348/46 |
| 2014/0161367 A1* | 6/2014 | Ridenour | H04N 19/115 |
| | | | 382/233 |
| 2015/0103909 A1* | 4/2015 | Pandey | H04N 19/503 |
| | | | 375/240.13 |
| 2015/0237346 A1* | 8/2015 | Symes | H04N 19/15 |
| | | | 375/240.03 |
| 2016/0156855 A1* | 6/2016 | Boulanger | G06T 1/20 |
| | | | 348/164 |
| 2016/0269735 A1* | 9/2016 | Kim | H04N 19/17 |
| 2017/0054982 A1* | 2/2017 | Vellore Arumugam | |
| | | | H04N 19/17 |
| 2017/0201756 A1* | 7/2017 | Chen | H04N 19/436 |
| 2018/0227484 A1* | 8/2018 | Hung | H04N 5/23238 |
| 2018/0249091 A1* | 8/2018 | Ding | H04N 5/23232 |
| 2019/0087660 A1* | 3/2019 | Hare | G06K 9/00711 |

\* cited by examiner

FRAME PROCESSING METHOD AND DEVICE

CROSS-REFERENCE TO RELATED APPLICATIONS

This application claims priority to Chinese Patent Application 201711166344.X filed Nov. 21, 2017, which his hereby incorporated by reference in its entirety.

BACKGROUND OF THE INVENTION

Field of the Invention

The present disclosure relates to image processing methods and devices and, more particularly, to a frame processing method and device.

Description of the Prior Art

Conventional built-in camera applications or third-party camera-related applications of cellular phones require a frame rate of around 25 frames per second (fps), that is, the frame-to-frame time interval is around 40 milliseconds (ms). Additional processing performed in a preview, for example, human face beautification performed in a frame image, must take 40 ms or less in order not to reduce the frame rate of the preview. Take human face beautification as an example, preview frame hysteresis will occur, if the processing of each frame takes more than 40 ms with a view to enhancing beautification. By contrast, finishing human face beautification in 40 ms or less inevitably reduces beautification processing and thus performs beautification ineffectively.

SUMMARY OF THE INVENTION

A frame processing method and device provided by the present disclosure overcome a drawback of the prior art, that is, given a fixed frame rate, overly long duration of processing of each frame causes frame hysteresis.

In the first aspect of the present disclosure, there is provided a frame processing method, the method comprising: receiving a first frame by a first processing unit; sending, by the first processing unit and before receiving a second frame processed with a third processing unit, the first frame to a second processing unit, followed by processing the first frame with the second processing unit or processing the first frame with the second processing unit and another processing unit; and receiving a third frame by the first processing unit before the first processing unit receives the first frame processed with the second processing unit or processed with the second processing unit and the other processing unit.

According to the first aspect of the present disclosure, in the first practicable manner of the first aspect of the present disclosure, the first, second and third frames sent to the first processing unit are regularly sent, with a first period defined as a time interval between the first frame and the second frame and defined as a time interval between the second frame and the third frame.

According to the first aspect of the present disclosure or the first practicable manner of the first aspect of the present disclosure, in the second practicable manner of the first aspect of the present disclosure, the processing comprises image processing.

According to the first aspect of the present disclosure, the first practicable manner of the first aspect of the present disclosure, or the second practicable manner of the first aspect of the present disclosure, in the third practicable manner of the first aspect of the present disclosure, the step of receiving the first frame by the first processing unit comprises receiving the first frame from an image-capturing device by the first processing unit.

According to the first aspect of the present disclosure or any one of the first through third practicable manners of the first aspect of the present disclosure, in the fourth practicable manner of the first aspect of the present disclosure, the method further comprises processing the first frame with the first processing unit before the first processing unit receives the second frame processed with the third processing unit and before sending the first frame to the second processing unit.

According to the first aspect of the present disclosure or any one of the first through fourth practicable manners of the first aspect of the present disclosure, in the fifth practicable manner of the first aspect of the present disclosure, the step of processing the first frame with the second processing unit and the other processing unit comprises: processing the first frame with the second processing unit; or processing the first frame with the second processing unit, sending the first frame from the second processing unit to the third processing unit, and processing the first frame further with the third processing unit.

According to the first aspect of the present disclosure or any one of the first through fifth practicable manners of the first aspect of the present disclosure, in the sixth practicable manner of the first aspect of the present disclosure, the method further comprises: sending from the first processing unit to an image-capturing device the second frame fully processed with the third processing unit and the first frame processed with the second processing unit or processed with the second processing unit and another processing unit.

According to the sixth practicable manner of the first aspect of the present disclosure, in the seventh practicable manner of the first aspect of the present disclosure, after the first processing unit has received the first frame processed with the second processing unit or processed with the second processing unit and another processing unit, the method further comprises processing the received first frame with the first processing unit.

According to the first aspect of the present disclosure or any one of the first through seventh practicable manners of the first aspect of the present disclosure, in the eighth practicable manner of the first aspect of the present disclosure, the method further comprising sending the third frame from the first processing unit to the third processing unit for processing.

In the second aspect of the present disclosure, there is provided a frame processing device, the device comprising: a first processing unit for receiving a first frame; a second processing unit for processing the first frame or processing the first frame together with another processing unit; and a third processing unit for processing a second frame, wherein the first processing unit sends the first frame to the second processing unit before receiving the second frame processed with the third processing unit, wherein the first processing unit receives a third frame before receiving the first frame processed with the second processing unit or processed with the second processing unit and the other processing unit.

According to the second aspect of the present disclosure, in the first practicable manner of the second aspect of the present disclosure, the first, second and third frames sent to the first processing unit are regularly sent, with a first period defined as a time interval between the first frame and the second frame and defined as a time interval between the second frame and the third frame.

According to the second aspect of the present disclosure or the first practicable manner of the second aspect of the present disclosure, in the second practicable manner of the second aspect of the present disclosure, the processing comprises image processing.

According to the second aspect of the present disclosure, the first practicable manner of the second aspect of the present disclosure, or the second practicable manner of the second aspect of the present disclosure, in the third practicable manner of the second aspect of the present disclosure, the first processing unit receives the first frame from an image-capturing device.

According to the second aspect of the present disclosure or any one of the first through third practicable manners of the second aspect of the present disclosure, in the fourth practicable manner of the second aspect of the present disclosure, the first processing unit processes the first frame before receiving the second frame processed with the third processing unit and sending the first frame to the second processing unit.

According to the second aspect of the present disclosure or any one of the first through fourth practicable manners of the second aspect of the present disclosure, in the fifth practicable manner of the second aspect of the present disclosure, the second processing unit either processes the first frame or processes the first frame to therefore send the first frame to the third processing unit for further processing the first frame.

According to the second aspect of the present disclosure or any one of the first through fifth practicable manners of the second aspect of the present disclosure, in the sixth practicable manner of the second aspect of the present disclosure, the first processing unit sends to an image-capturing device the second frame processed with the third processing unit and the first frame processed with the second processing unit or processed with the second processing unit and another processing unit.

According to the sixth practicable manner of the second aspect of the present disclosure, in the seventh practicable manner of the second aspect of the present disclosure, after receiving the first frame processed with the second processing unit or processed with the second processing unit and another processing unit, the first processing unit processes the first frame received.

According to the second aspect of the present disclosure or any one of the first through seventh practicable manners of the second aspect of the present disclosure, in the eighth practicable manner of the second aspect of the present disclosure, the first processing unit sends the third frame to the third processing unit for processing.

In the third aspect of the present disclosure, there is provided a computer-readable storage medium. The computer-readable storage medium stores a computer program. The steps of the method in any one of the first through eighth practicable manners of the first aspect of the present disclosure, according to the first aspect of the present disclosure, are implemented upon execution of the computer program by a first processor.

In the fourth aspect of the present disclosure, there is provided a frame processing device, comprising a memory, a second processor, and a computer program stored in the memory and executable by the second processor, wherein the computer program is executed by the second processor to implement the steps of the method in any one of the first through eighth practicable manners of the first aspect of the present disclosure, according to the first aspect the present disclosure.

A frame processing method and device provided by the present disclosure preclude frame hysteresis, at a fixed frame rate and with invariable processability of each frame.

DETAILED DESCRIPTION OF THE EMBODIMENTS

Figure 1:
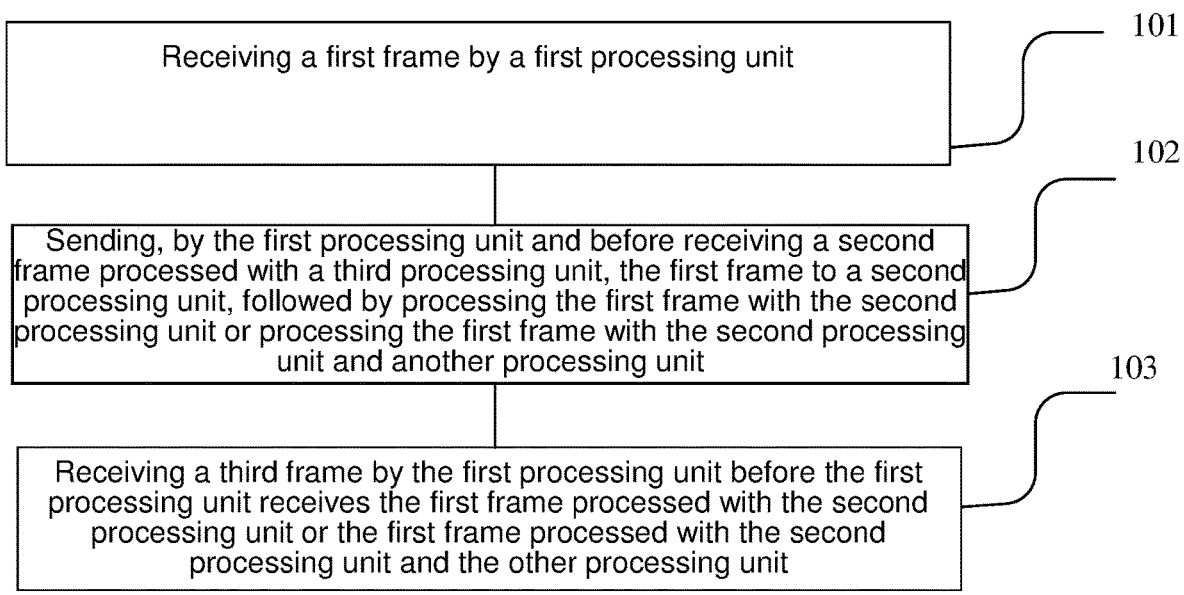
FIG. 1 is a schematic view of a process flow of a frame processing method provided in the first embodiment of the present disclosure.

The embodiments of the present disclosure are illustrated by the accompanying drawings and described in detail below.

Terms, such as "first" and "second", used herein and the accompanying drawings are intended for differentiations rather than specific sequences.

The wording "and/or" used in the embodiments of the present disclosure is descriptive of correlations and, more particularly, three correlations. For example, "A and/or B" defines three situations: "A", "A and B", and "B".

In the embodiments of the present disclosure, terms "illustrate", "illustrative" and "example" serve exemplary, evidential or explanatory purposes. No embodiment or solution provided in the present disclosure and described with the terms "illustrate", "illustrative" or "example" may be interpreted as being more preferable or advantageous than any other embodiments or solutions provided in the present disclosure. Specifically speaking, the terms "illustrate", "illustrative" and "example" are intended to present related concepts concretely.

For the sake of conciseness and clarity, the accompanying drawings are not necessarily drawn to scale. For example, for the sake of clarity, as shown in the accompanying drawings, some components are enlarged, but their counterparts are not. Furthermore, identical reference numerals may be used in the accompanying drawings repeatedly, as appropriate, to denote corresponding or similar components.

A frame processing method provided by the first embodiment of the present disclosure is illustrated by FIG. 1 and described in detail below. As shown in FIG. 1, the method comprises steps described below.

Step 101: receiving a first frame by a first processing unit.

The step of receiving the first frame by the first processing unit comprises receiving the first frame from an image-capturing device by the first processing unit. Specifically speaking, the first frame is a frame in a preview image of an image-capturing device. The step of receiving the first frame comprises receiving the first frame from an image-capturing device or receiving the first frame from a memory device. The memory device is a random-access memory (RAM), flash memory or read-only memory (ROM).

Step 102: sending, by the first processing unit and before receiving a second frame processed with a third processing unit, the first frame to a second processing unit, followed by processing the first frame with the second processing unit or processing the first frame with the second processing unit and another processing unit.

Step 103: receiving a third frame by the first processing unit before the first processing unit receives the first frame processed with the second processing unit or the first frame processed with the second processing unit and the other processing unit.

Figure 2:
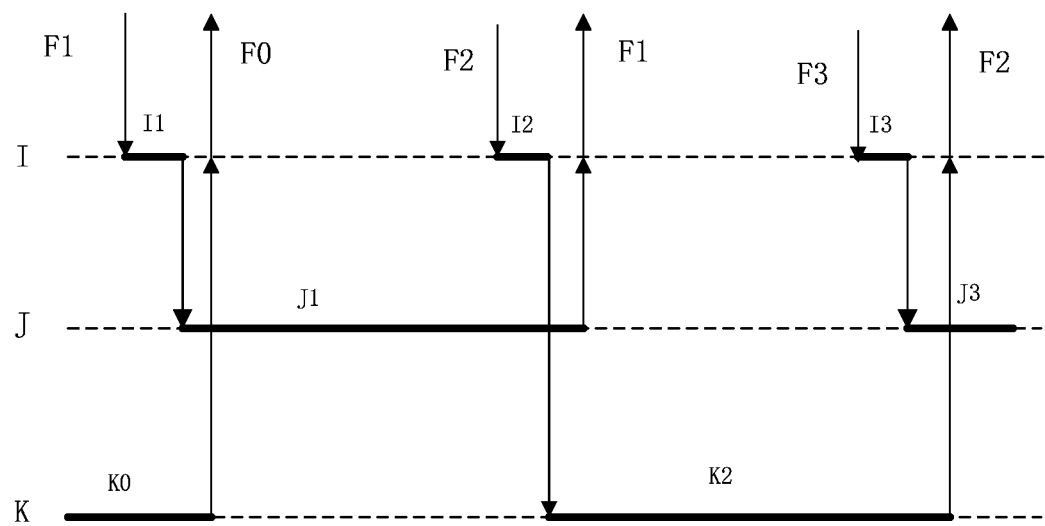
FIG. 2 is a sequence diagram of another frame processing method provided in the first embodiment of the present disclosure.

Optionally, the first processing unit, the second processing unit and the third processing unit are identical multi-core processors, different cores of different processors, different threads or processes of the same single-core processor, different threads or processes of the same multi-core processor, or different processors. As shown in FIG. 2, reference signs I, J, and K denote the first processing unit, the second processing unit and the third processing unit, respectively. Optionally, embodiments of the present disclosure are exemplified by different threads I, J, and K.

The first frame, second frame and third frame are consecutive frames sent from an image-capturing device to the first processing unit regularly; the sending period is defined as a first period T, with T defined as the time interval between the first frame and the second frame and defined as the time interval between the second frame and the third frame. As shown in FIG. 2, F1 denotes the first frame, F0 denotes the second frame, and F2 denotes the third frame.

The processing is image processing. Specifically speaking, the image processing comprises creating visual effects, human face beautification, and background blurring.

Optionally, before the first processing unit receives the second frame processed with the third processing unit and sends the first frame to the second processing unit, the method further comprises: processing the first frame with the first processing unit. As shown in FIG. 2, a thread I receives frame F1, and then the thread I processes frame F1 before sending frame F1 to a thread J. The processing course of the thread I is denoted by 11. The thread I must send frame F1 to the thread J before receiving frame F0, because the thread I must receive frame F0 fully processed with a thread K. Similarly, the thread I must send frame F2 to the thread K before receiving frame F1.

Figure 5:
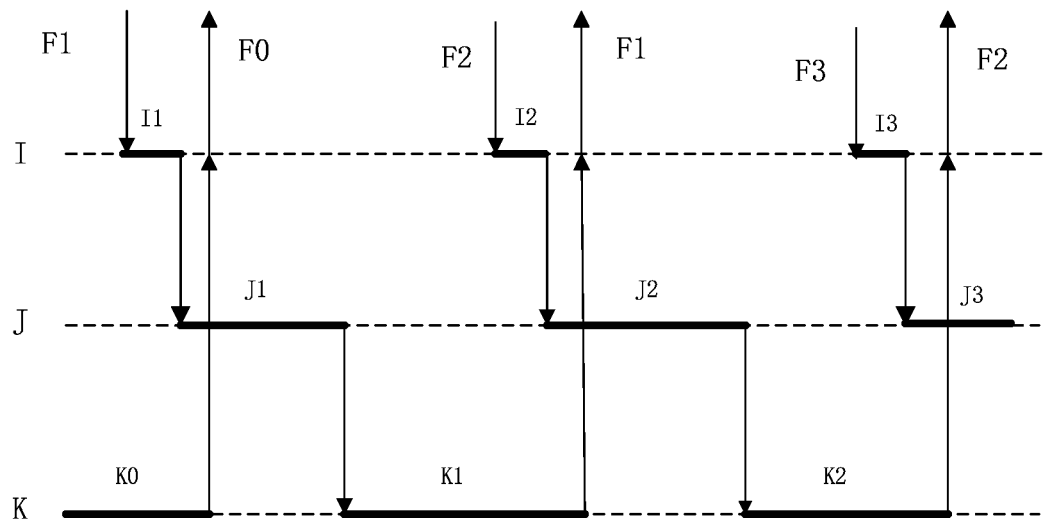
FIG. 5 is a sequence diagram of a further frame processing method provided by the first embodiment of the present disclosure.

The step of processing the first frame with the second processing unit and another processing unit comprises: processing the first frame with the second processing unit; or processing the first frame with the second processing unit, sending the first frame from the second processing unit to the third processing unit, and processing the first frame further with the third processing unit. As shown in FIG. 2, after receiving frame F1 partially processed with the thread I, the thread J processes frame F1 to the full. The processing course of the thread J is denoted by J1. In another example, regarding the step of processing the frame F1 with the second processing unit and the third processing unit, as shown in FIG. 5, after receiving frame F1 partially processed with the thread I, the thread J processes frame F1. The processing course of the thread J is denoted by J1. Afterward, the thread J sends partially-processed frame F1 to the thread K which then processes frame F1 to the full. The processing course of the thread K is denoted by K1.

Furthermore, the first processing unit sends to the image-capturing device the first frame processed with the second processing unit or the first frame processed with the second processing unit and another processing unit. As shown in FIG. 2, after processing frame F1 to the full, the thread J sends the fully-processed frame F1 to the thread I, and then the thread I sends the fully-processed frame F1 to an image-capturing device for displaying the fully-processed frame F1 on a preview screen. In another example, as shown in FIG. 5, the thread K processes frame F1 to the full and sends the fully-processed frame F1 to the thread I which then sends the fully-processed frame F1 to the image-capturing device for displaying the fully-processed frame F1 on the preview screen.

Optionally, the first processing unit sends the second frame processed with the third processing unit to the image-capturing device. As shown in FIG. 2, after receiving from the thread K the frame F0 fully processed with the thread K, the thread I sends the fully-processed frame F0 to the image-capturing device.

Optionally, the method further comprises: sending the third frame from the first processing unit to the third processing unit for processing. As shown in FIG. 2, after receiving frame F2, the thread I sends frame F2 to the thread K for processing. The processing course of the thread K is denoted by K2. Optionally, after receiving frame F2, the thread I processes frame F2 partially and then sends the partially-processed frame F2 to the thread K for processing.

Figure 4:
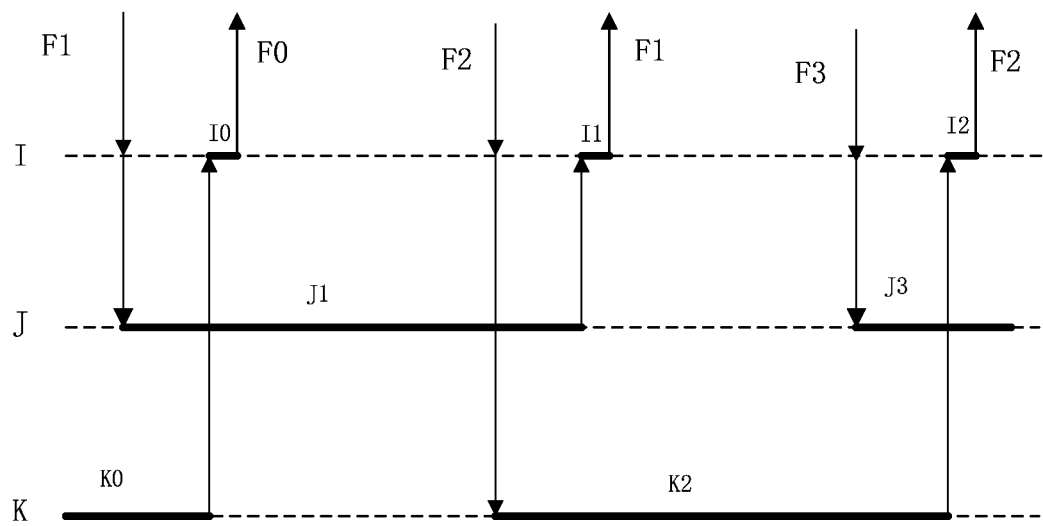
FIG. 4 is a sequence diagram of still yet another frame processing method provided by the first embodiment of the present disclosure.

Optionally, after the first processing unit has received the first frame processed with the second processing unit or processed with the second processing unit and another processing unit, the method further comprises: processing by the first processing unit the first frame received. As shown in FIG. 4, after receiving frame F1 processed with the thread J, the thread I processes frame F1 to the full. The processing course of the thread I in FIG. 4 is denoted by 11.

After receiving a frame from the image-capturing device, the first processing unit either processes the frame partially and sends the partially-processed frame to another processing unit or sends the frame to another processing unit for processing; and/or, after receiving a frame partially processed with another processing unit, the first processing unit further processes the frame partially and then sends the partially-processed frame to the image-capturing device, or, after receiving a frame fully processed with another processing unit, the first processing unit sends the fully-processed frame to the image-capturing device.

Figure 3:
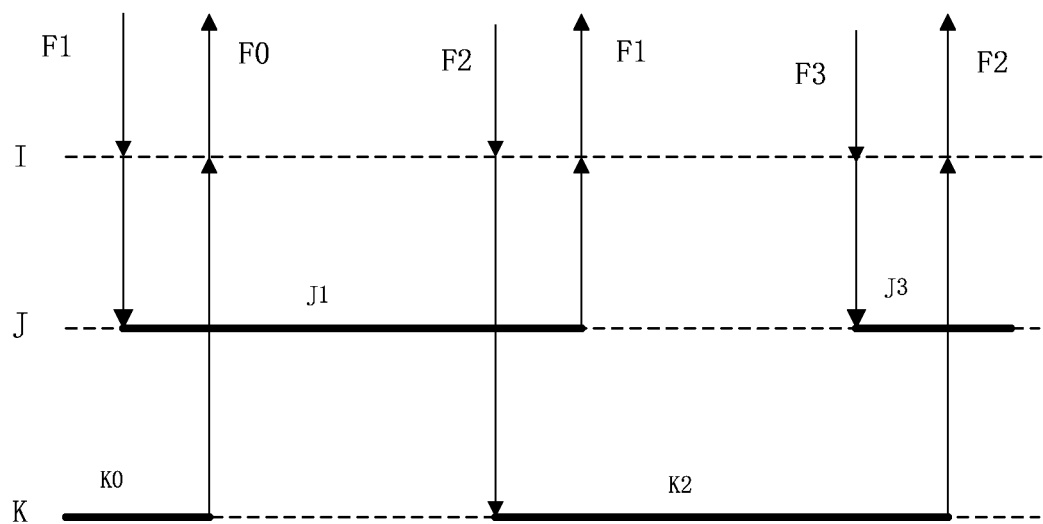
FIG. 3 is a sequence diagram of yet another frame processing method provided by the first embodiment of the present disclosure.

In another embodiment of the present disclosure, as shown in FIG. 3, after receiving frame F1 from the image-capturing device, the thread I sends frame F1 to the thread J for processing. The thread J processes frame F1 to the full and then sends the fully-processed frame F1 to the thread I. The thread I sends the fully-processed frame F1 to the image-capturing device. After receiving frame F1, the thread I receives frame F0 fully-processed with the thread K. Afterward, the thread I sends the fully-processed frame F0 to the image-capturing device. Before receiving the frame F1 fully processed with the thread J, the thread I receives frame F2 from the image-capturing device and sends the frame F2 to the thread K for processing. The embodiment illustrated by FIG. 3 discloses a reduced number of instance of transmission of frames between the threads, simple process flow, and low complexity.

In another aspect, as shown in FIG. 4, the embodiment shown in FIG. 4 is distinguished from the embodiment shown in FIG. 3 by the following: the thread J does not process frame F1 to the full; instead, the thread J sends the partially-processed frame F1 to the thread I; the thread I processes the frame F1 to the full and then sends it to the image-capturing device.

In another aspect, as shown in FIG. 5, the embodiment shown in FIG. 5 is distinguished from the embodiment shown in FIG. 2 by the following: the thread J receives frame F1 from the thread I; the thread J processes frame F1 partially and sends the partially-processed frame F1 to the thread K; the thread K processes frame F1 to the full and then sends it to the thread I. The partial processing means that the entire processing is not carried out to the full, wherein the processing course J1 entails finishing a specific portion of the processing. The embodiment shown in FIG. 5 discloses enhancing the flexibility of processing resource allocation.

At a fixed frame rate and with invariable processability of each frame, a frame processing method provided in an embodiment of the present disclosure not only precludes frame hysteresis but also precludes a reduction in the frame rate after frame processing has finished.

Figure 6:
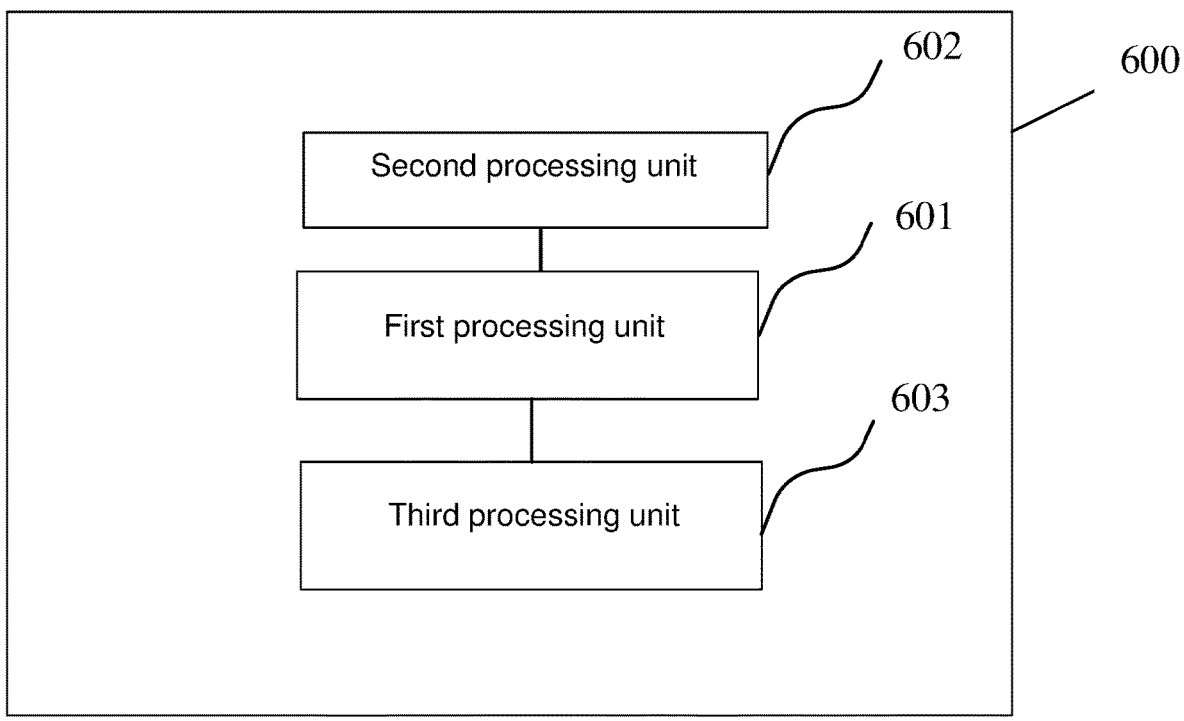
FIG. 6 is a schematic view of structure of a frame processing device provided by the second embodiment of the present disclosure.

A frame processing device 600 provided in the second embodiment of the present disclosure is depicted by FIG. 6 and described in detail below. As shown in FIG. 6, the device 600 comprises a first processing unit 601, a second processing unit 602 and a third processing unit 603.

The first processing unit 601 receives the first frame.

In particular, the first processing unit receives the first frame from the image-capturing device. Specifically speaking, the first frame is a frame in a preview image of the image-capturing device. The step of receiving the first frame comprises receiving the first frame from an image-capturing device or receiving the first frame from a memory device. The memory device is a random-access memory (RAM), flash memory or read-only memory (ROM).

Before receiving the second frame processed with the third processing unit 603, the first processing unit 601 sends the first frame to the second processing unit 602. Afterward, the second processing unit 602 processes the first frame; alternatively, the second processing unit 602 and another processing unit process the first frame.

The first processing unit 601 receives a third frame before receiving the first frame processed with the second processing unit 602 or processed with the second processing unit 602 and another processing unit.

Optionally, the first processing unit, the second processing unit and the third processing unit are identical multi-core processors, different cores of different processors, different threads or processes of the same single-core processor, different threads or processes of the same multi-core processor, or different processors, respectively. As shown in FIG. 2, reference signs I, J, and K denote the first processing unit, the second processing unit and the third processing unit, respectively. Optionally, embodiments of the present disclosure are exemplified by different threads I, J, and K.

The first frame, second frame and third frame are consecutive frames sent from an image-capturing device to the first processing unit periodically; the sending period is defined as a first period T, with T defined as the time interval between the first frame and the second frame and defined as the time interval between the second frame and the third frame. As shown in FIG. 2, F1 denotes the first frame, F0 denotes the second frame, and F2 denotes the third frame.

The processing is image processing. Specifically speaking, the image processing comprises creating visual effects, human face beautification, and background blurring.

Optionally, the first processing unit processes the first frame before receiving the second frame processed with the third processing unit and sending the first frame to the second processing unit. As shown in FIG. 2, the thread I receives frame F1, and the thread I processes frame F1 before sending frame F1 to the thread J. The processing course of the thread I is denoted by I1. The thread I must receive frame F0 fully processed with the thread K; hence, the thread I must send frame F1 to the thread J before receiving frame F0. Similarly, the thread I must send frame F2 to the thread K before receiving frame F1.

The second processing unit processes the first frame. Alternatively, the second processing unit processes the first frame and sends the first frame to the third processing unit, and then the third processing unit processes the first frame. As shown in FIG. 2, after receiving frame F1 partially processed with the thread I, the thread J processes the partially-processed frame F1 to the full. The processing course of the thread J is denoted by J1. In another example, the second processing unit and the third processing unit process the frame F1, as shown in FIG. 5, after receiving frame F1 partially processed with the thread I, the thread J processes the partially-processed frame F1. The processing course of the thread J is denoted by J1. Afterward, the thread J sends the partially-processed frame F1 to the thread K which then processes frame F1 to the full. The processing course of the thread K is denoted by K1.

The first processing unit sends to the image-capturing device the first frame processed with the second processing unit or processed with the second processing unit and another processing unit. As shown in FIG. 2, after processing frame F1 to the full, the thread J sends the fully-processed frame F1 to the thread I, and then the thread I sends the fully-processed frame F1 to the image-capturing device for displaying it on the preview screen. In another example, as shown in FIG. 5, after processing frame F1 to the full, the thread K sends the fully-processed frame F1 to the thread I such that the thread I sends the fully-processed frame F1 to the image-capturing device for displaying it on the preview screen.

The first processing unit sends to the image-capturing device the second frame fully processed with the third processing unit. As shown in FIG. 2, after receiving frame F0 fully processed with the thread K, the thread I sends it to the image-capturing device.

The first processing unit sends the third frame to the third processing unit for processing. As shown in FIG. 2, after receiving frame F2, the thread I sends the frame F2 to the thread K for processing. The processing course of the thread K is denoted by K2. Optionally, after receiving frame F2, the thread I processes frame F2 partially and then sends the partially-processed frame F2 to the thread K for processing.

After receiving the first frame processed with the second processing unit or processed with the second processing unit and another processing unit, the first processing unit processes the first frame received. As shown in FIG. 4, after receiving frame F1 processed with the thread J, the thread I processes frame F1 to the full. The processing course of the thread I in FIG. 4 is denoted by I1.

After receiving a frame from the image-capturing device, the first processing unit either processes the frame partially and sends it to another processing unit or sends the frame to another processing unit for processing; and/or, after receiving a frame partially processed with another processing unit, the first processing unit further processes the frame partially and then sends the partially-processed frame to the image-capturing device, or, after receiving a frame fully processed with another processing unit, the first processing unit sends the fully-processed frame to the image-capturing device.

In another embodiment of the present disclosure, as shown in FIG. 3, after receiving frame F1 from the image-capturing device, the thread I sends frame F1 to the thread J for processing such that the thread J processes frame F1 to the full and then sends the fully-processed frame F1 to the thread I, and in consequence the thread I sends the fully-processed frame F1 to the image-capturing device. After receiving frame F1, the thread I receives frame F0 processed with the thread K to the full and then sends it to the image-capturing device. Before receiving the frame F1 fully processed with the thread J, the thread I receives frame F2 from the image-capturing device and sends the frame F2 to the thread K for processing. The embodiment illustrated by FIG. 3 discloses a reduced number of instance of transmission of frames between the threads, simple process flow, and low complexity.

In another aspect, as shown in FIG. 4, the embodiment shown in FIG. 4 is distinguished from the embodiment shown in FIG. 3 by the following: the thread J does not process frame F1 to the full; instead, the thread J sends the partially-processed frame F1 to the thread I; the thread I processes the frame F1 to the full and then sends it to the image-capturing device.

In another aspect, as shown in FIG. 5, the embodiment shown in FIG. 5 is distinguished from the embodiment shown in FIG. 2 by the following: after receiving frame F1 from the thread I, the thread J processes frame F1 but not to the full; instead, the thread J sends the partially-processed frame F1 to the thread K; the thread K processes the frame F1 to the full and then sends it to the thread I. The partial processing means that the entire processing is not carried out to the full, wherein the processing course J1 entails finishing a specific portion of the processing. The embodiment shown in FIG. 5 discloses enhancing the flexibility of processing resource allocation.

At a fixed frame rate and with invariable processability of each frame, a frame processing device provided in an embodiment of the present disclosure not only precludes frame hysteresis but also precludes a reduction in the frame rate after frame processing has finished.

Figure 7:
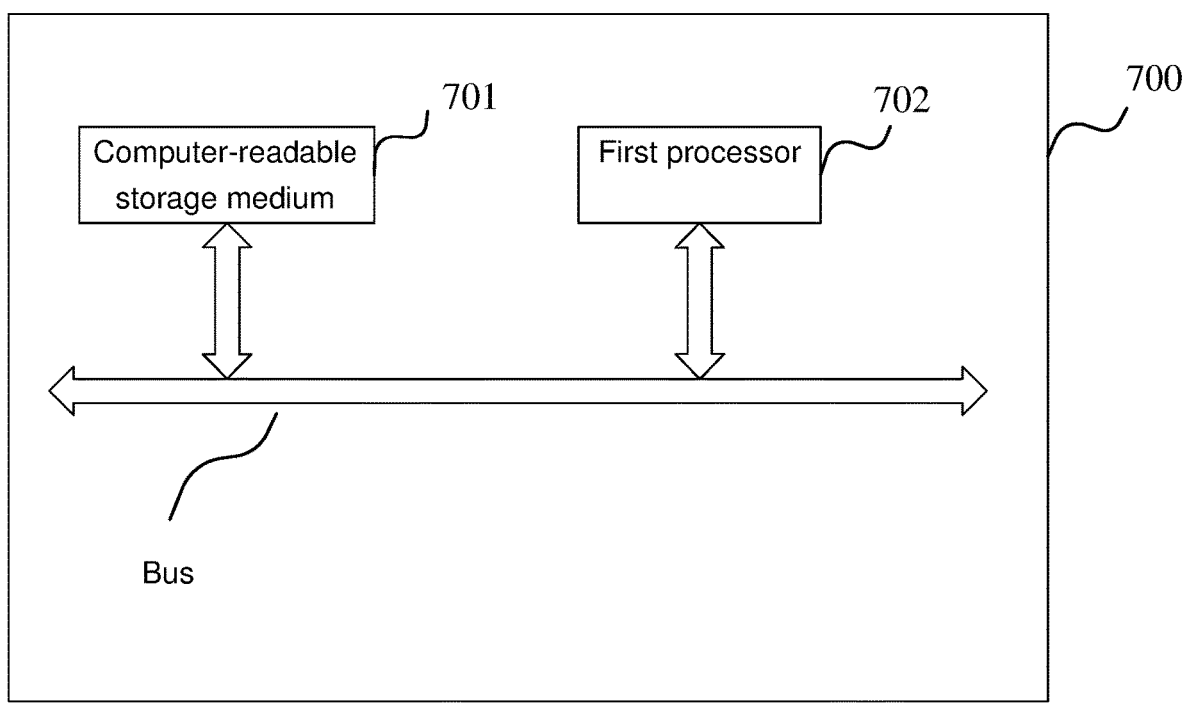
FIG. 7 is a schematic view of structure of a frame processing device provided by the third embodiment of the present disclosure.

A frame processing device 700 provided in the third embodiment of the present disclosure is depicted by FIG. 7 and described below. The device 700 comprises a computer-readable storage medium 701. The computer-readable storage medium 701 stores a computer program. The computer program implements the steps of the method in the first embodiment when executed by a first processor 702. As shown in FIG. 5, optionally, the device 700 comprises a bus.

Functions of components in this embodiment are identical to those in the first or second embodiment.

At a fixed frame rate and with invariable processability of each frame, a frame processing device provided in an embodiment of the present disclosure not only precludes frame hysteresis but also precludes a reduction in the frame rate after frame processing has finished.

Figure 8:
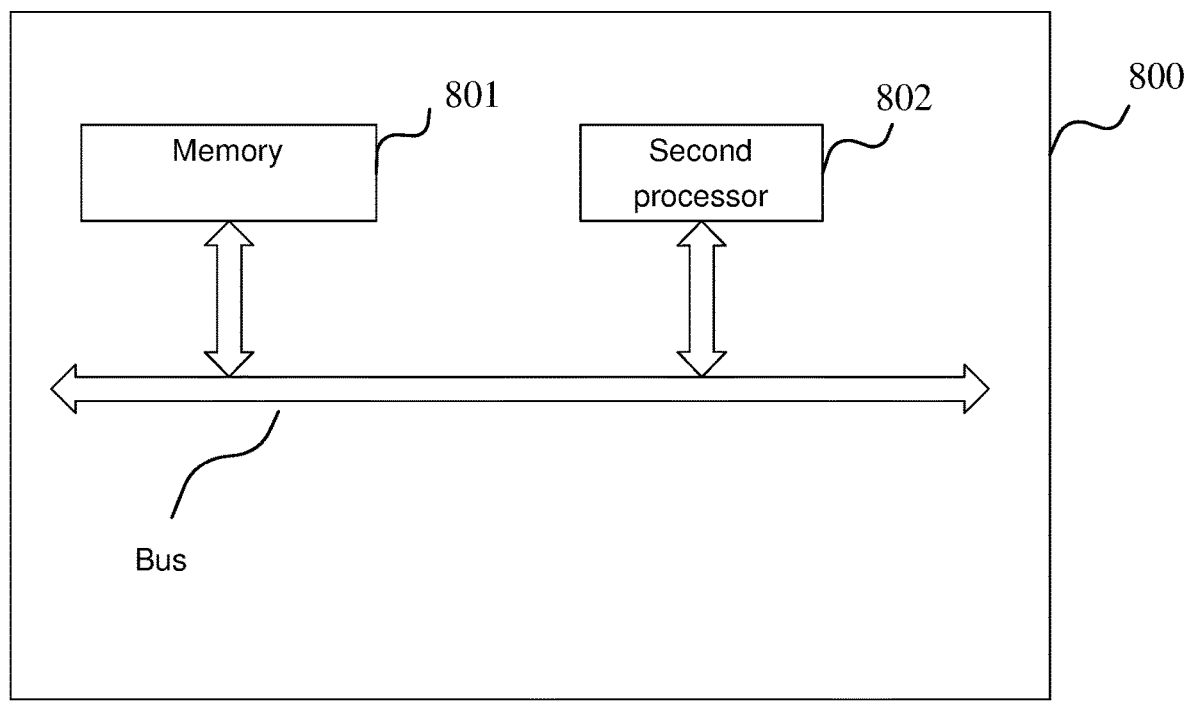
FIG. 8 is a schematic view of structure of a frame processing device provided by the fourth embodiment of the present disclosure.

A frame processing device 800 provided in the fourth embodiment of the present disclosure is depicted by FIG. 8 and described below. The device 800 comprises a memory 801, a second processor 802, and a computer program stored in the memory 801 and executable by the second processor 802, wherein the steps of the method of the first embodiment are implemented upon execution of the computer program by the second processor 802. Optionally, as shown in FIG. 8, the device 800 further comprises a bus.

At a fixed frame rate and with invariable processability of each frame, a frame processing device provided in an embodiment of the present disclosure not only precludes frame hysteresis but also precludes a reduction in the frame rate after frame processing has finished.

For illustrative purposes, the computer program is divided into one or more modules/units. The one or more modules/units are stored in the memory and executed with the processor to implement the present disclosure. The one or more modules/units are a series of computer program command segments capable of accomplishing specific functions. The command segments are descriptive of the course of execution of the computer program in the device/terminal equipment.

The device/terminal equipment is a computation apparatus, such as cellular phone, tablet, desktop, notebook, palm-held computer and cloud server. The device/terminal equipment comprises, but is not limited to, a processor and a memory. Persons skilled in the art understand that the accompanying drawings of the present disclosure are illustrative of the device/terminal equipment rather than restrictive of the device/terminal equipment; hence, the device/terminal equipment comprises more components, combinations of specific components, or different components than are shown, or comprises less components, combinations of specific components, or different components than are shown. For example, the device/terminal equipment further comprises an input/output apparatus, network access apparatus, and a bus.

The processor is a central processing unit (CPU), another general-purpose processor, digital signal processor (DSP), application specific integrated circuit (ASIC), field-programmable gate array (FPGA) or another programmable logic device, separated gate or transistor logic device, separated hardware component, general-purpose processor microprocessor, or any conventional processor. The processor is the control center of the device/terminal equipment and employs various interfaces and wirings to connect to different parts of the device/terminal equipment in its entirety.

The memory stores the computer program and/or module. The processor implements various functions of the device/terminal equipment by operating or executing computer program and/or module stored in the memory and accessing data stored in memory. The memory comprises a program storage region and a data storage region. The program storage region stores an operating system and application required for at least one function (for example, an image-playing function). The data storage region stores data (for example, video data and images) created according to the usage of a cellular phone. Furthermore, the memory comprises high-speed random-access memory and further comprises non-volatile memory, for example, hard disk drive, random-access memory (RAM), external hard disk drive, smart media card (SMC), secure digital (SD) card, flash card, at least one magnetic disk storage, flash memory device, or another volatile solid-state memory device.

The device/terminal equipment integrated module/unit is stored in a computer-readable storage medium, so as to be implemented in the form of a software function unit and sold or used as a self-contained product. Therefore, the process flow of the method in the aforesaid embodiment of the present disclosure is implemented, in whole or in part, by related hardware under the instruction of the computer program. The computer program is stored in a computer-readable storage medium and implements the aforesaid steps of the method in the aforesaid embodiment when executed by the processor. The computer program comprises computer program code. The computer program code is in source code form, object code form, executable file or specific intermediate form. The computer-readable storage medium comprises: any device or entity carrying the computer program code, recording medium, USB flash drive, external hard disk drive, disk, compact disc, computer memory, read-only memory (ROM), random-access memory (RAM), electrical carrier signals, telecommunication signals and software distribution medium.

In the aforesaid embodiments, the imaging of a target object is either the partial imaging of the target object or the total imaging of the target object. Both the partial imaging and the total imaging are adjusted and then applied to the method or device provided by the present disclosure. The aforesaid adjustment can be devised by persons skilled in the art without making any creative effect and thus falls within the scope of the claims of the present disclosure.

What is claimed is:

1. A frame processing method, comprising the steps of:
   receiving a first frame by a first processing unit;
   sending, by the first processing unit and before receiving a second frame processed with a third processing unit, the first frame to a second processing unit, followed by processing the first frame with the second processing unit or processing the first frame with the second processing unit and another processing unit; and
   receiving a third frame by the first processing unit before the first processing unit receives the first frame processed with the second processing unit or processed with the second processing unit and the other processing unit,
   wherein the first processing unit, the second processing unit and the third processing unit are identical multi-core processors, different cores of different processors, different threads or processes of a single-core processor, different threads or processes of a multi-core processor, or different processors.

2. The method of claim 1, wherein:
   the first, second and third frames sent to the first processing unit are periodically sent; and
   a first period is a time interval between the first frame and the second frame and a time interval between the second frame and the third frame.

3. The method of claim 1, wherein the processing comprises image processing.

4. The method of claim 1, wherein the step of receiving the first frame by the first processing unit comprises receiving the first frame from an image-capturing device by the first processing unit.

5. The method of claim 1, further comprising processing the first frame with the first processing unit before the first processing unit receives the second frame processed with the third processing unit and before sending the first frame to the second processing unit.

6. The method of claim 1, wherein the step of processing the first frame with the second processing unit and the other processing unit comprises:
   processing the first frame with the second processing unit, sending the first frame from the second processing unit to the third processing unit, and processing the first frame further with the third processing unit.

7. The method of claim 1, further comprising sending from the first processing unit to an image-capturing device the second frame processed with the third processing unit and the first frame processed with the second processing unit or processed with the second processing unit and another processing unit.

8. The method of claim 7, wherein, after the first processing unit has received the first frame processed with the second processing unit or processed with the second processing unit and another processing unit, the method further comprises processing the received first frame with the first processing unit.

9. The method of claim 1, further comprising sending the third frame from the first processing unit to the third processing unit for processing.

10. A frame processing device, comprising:
    a first processing unit for receiving a first frame;
    a second processing unit for processing the first frame or processing the first frame together with another processing unit; and
    a third processing unit for processing a second frame,
    wherein the first processing unit sends the first frame to the second processing unit before receiving the second frame processed with the third processing unit,
    wherein the first processing unit receives a third frame before receiving the first frame processed with the second processing unit or processed with the second processing unit and the other processing unit, and
    wherein the first processing unit, the second processing unit and the third processing unit are identical multi-core processors, different cores of different processors, different threads or processes of a single-core processor, different threads or processes of a multi-core processor, or different processors.

11. The device of claim 10, wherein:
    the first, second and third frames sent to the first processing unit are periodically sent; and
    a first period is a time interval between the first frame and the second frame and a time interval between the second frame and the third frame.

12. The device of claim 10, wherein the processing comprises image processing.

13. The device of claim 10, wherein the first processing unit receives the first frame from an image-capturing device.

14. The device of claim 10, wherein the first processing unit processes the first frame before receiving the second frame processed with the third processing unit and sending the first frame to the second processing unit.

15. The device of claim 10, wherein:
    the second processing unit processes the first frame; or
    the second processing unit processes the first frame and sends the first frame to the third processing unit, and the third processing unit further processing the first frame.

16. The device of claim 10, wherein the first processing unit sends to an image-capturing device the second frame processed with the third processing unit and the first frame processed with the second processing unit or processed with the second processing unit and another processing unit.

17. The device of claim 16, wherein, after receiving the first frame processed with the second processing unit or processed with the second processing unit and another processing unit, the first processing unit processes the first frame received.

18. The device of claim 10, wherein the first processing unit sends the third frame to the third processing unit for processing.

19. A non-transitory computer-readable storage medium, for storing a computer program, wherein the steps of the method of claim 1 are implemented upon execution of the computer program by a first processor.

20. A frame processing device, comprising a memory, a second processor, and a computer program stored in the memory and executable by the second processor, wherein the steps of the method of claim 10 are implemented upon execution of the computer program by the second processor.

\* \* \* \* \*